May 20, 1941.  R. H. DEAN  2,242,746
AUTOMOBILE BODY WINDOW ASSEMBLY
Filed May 6, 1940  3 Sheets-Sheet 1
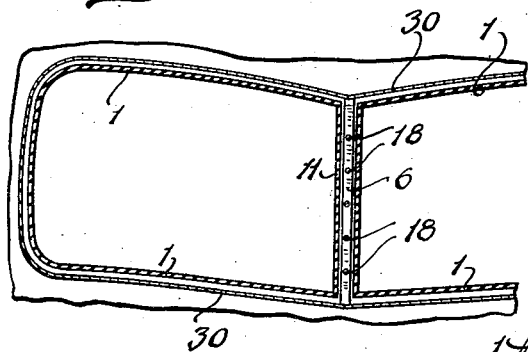
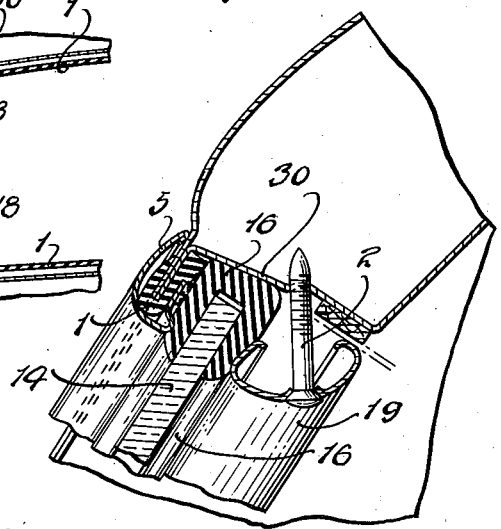
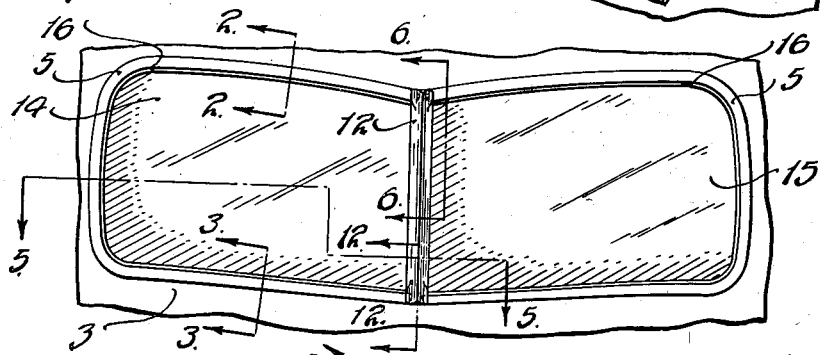
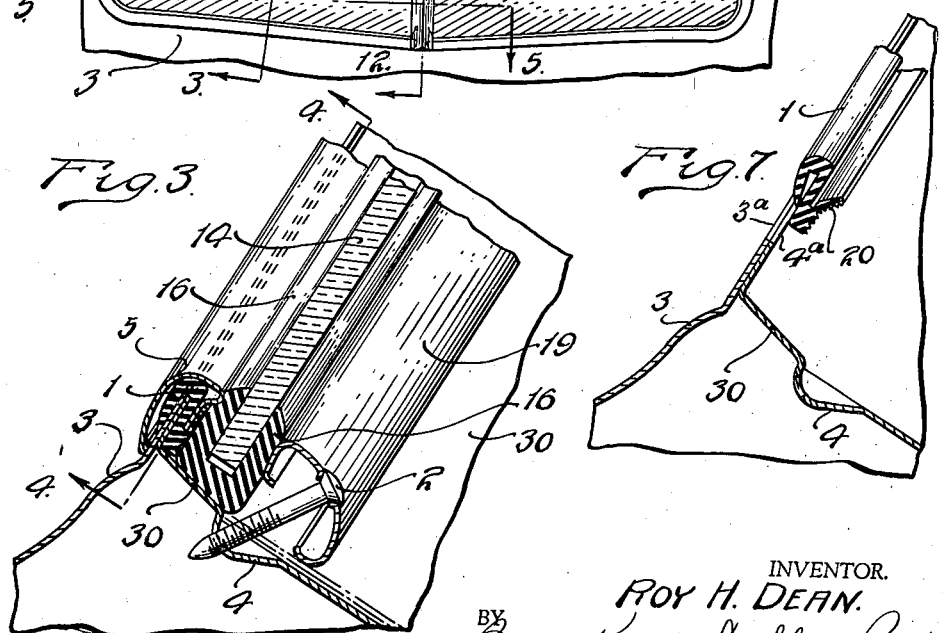
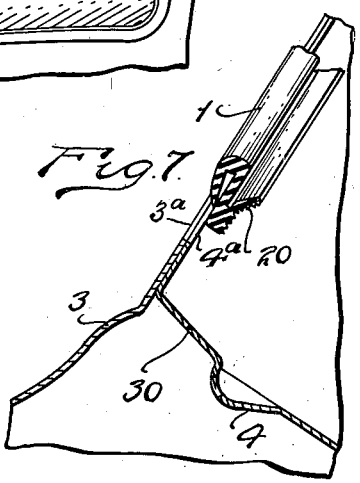
INVENTOR.
ROY H. DEAN.
BY Barnes, Kisselle, Laughlin & Raisch
ATTORNEYS.

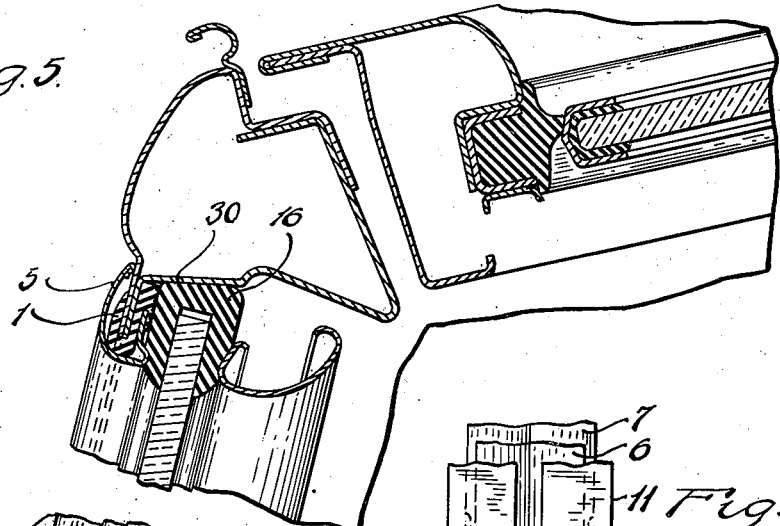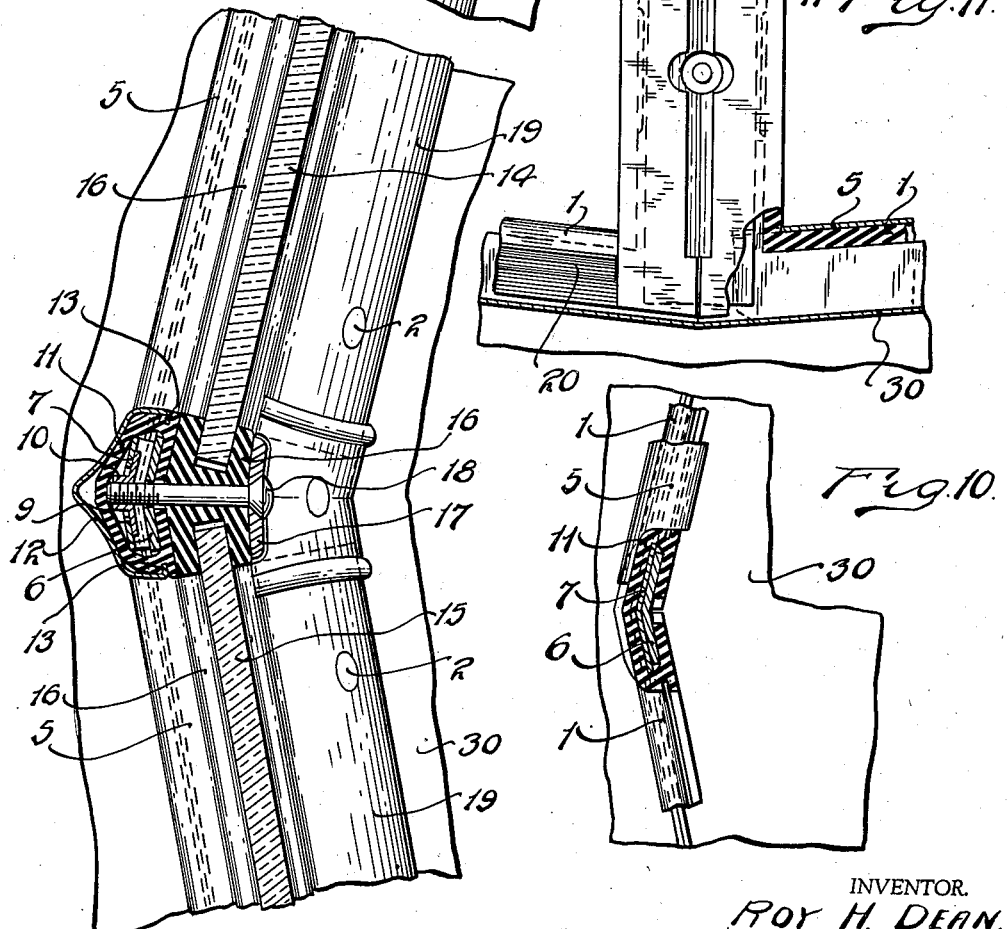

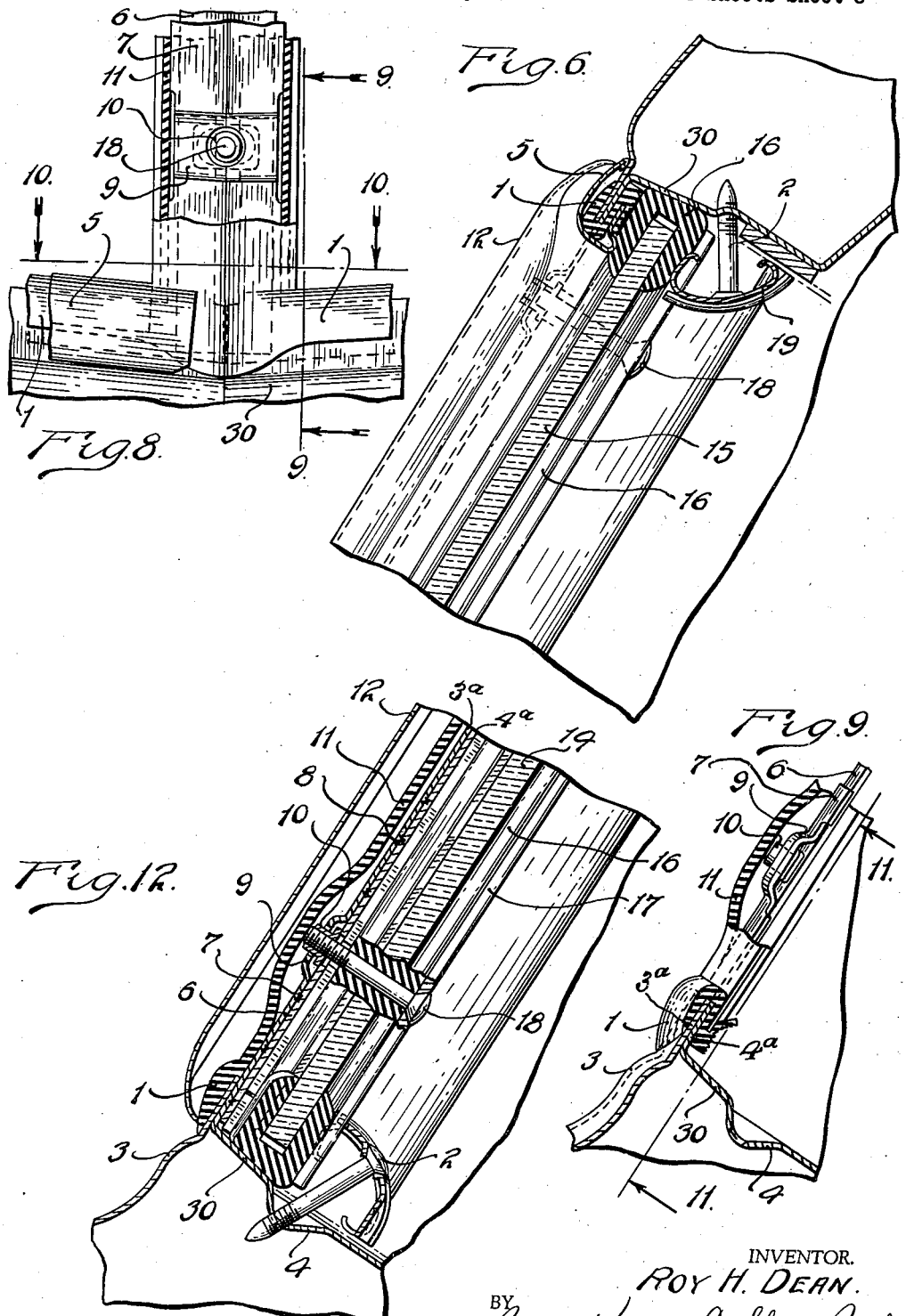

Patented May 20, 1941

2,242,746

UNITED STATES PATENT OFFICE 2,242,746

AUTOMOBILE BODY WINDOW ASSEMBLY

Roy H. Dean, Detroit, Mich., assignor to Ternstedt Manufacturing Company, Detroit, Mich., a corporation of Michigan Application May 6, 1940, Serial No. 333,571

4 Claims. (Cl. 296—84)

This invention relates to assembling and weathersealing a window, particularly an automobile body window, and is especially designed for use in connection with windshields. The so-called solid windshields are now in common use in automobiles and it is desirable to get a sealing and a weathering for the shield and the division pillar which can be easily assembled and which will provide as nearly as possible waterproof joints. The present assembly is directed to that end.

In the drawings:

Fig. 1 is a fragmentary part of an automobile body showing the windshield in elevation.

Fig. 2 is a section on the line 2—2 of Fig. 1.

Fig. 3 is a section on the line 3—3 of Fig. 1.

Fig. 4 is a section on the line 4—4 of Fig. 3.

Fig. 5 is a section on the line 5—5 of Fig. 1.

Fig. 6 is a section on the line 6—6 of Fig. 1.

Fig. 7 is a fragmentary section through the cowl showing how the pinch-weld flange weatherstrip is seated.

Fig. 8 is a detail at the lower end of the division pillar.

Fig. 9 is a section on the line 9—9 of Fig. 8.

Fig. 10 is a section on the line 10—10 of Fig. 8.

Fig. 11 is a view taken on the line 11—11 of Fig. 9.

Fig. 12 is a section through the lower end of the windshield division pillar and the adjacent parts.

Referring to Fig. 3, which is a vertical section through the windshield opening: It will be seen that a rubber weatherstrip 1 straddles the pinch-welded flanges 3a and 4a which surround the windshield opening. These flanges here are the upper flange of the cowl 3 and the inner windshield stamping 4. Referring to Fig. 7: These parts are shown a little more clearly because they are disassembled. The weatherstrip is roughly Z shape in cross section with oppositely facing clefts arranged at the front to straddle the pinch-weld flanges and, at its rear, to straddle the flange of the reveal molding 5.

This weatherstrip is first assembled on the pinch-weld flanges, as shown at Fig. 7, and is assembled around the entire windshield opening. It will be noticed that, at the division pillar 6 (see Fig. 12), the rear part of this weatherstrip is cut away so that the strip may pass over the pinch-weld where the pinch-weld extends through the division pillar assembly.

A portion of the center pillar 7 is integral with inner stamping 4. It will be noted that (in Fig. 12) this strip 7 is a continuation of the pinch-weld flange of the portion of the stamping which forms the top of the instrument board. A second strip 8 is spot-welded to the strip 7 to form the core of the division pillar. The outer strip 7 is struck out at 9 to form pockets for the T nuts 10. The center pillar weatherstrip 11 can be snapped over the center pillar core as this strip is in cross section a shallow channel with overhanging side walls. By referring to Fig. 5, it will be seen that it may be described crudely as being an elongated C. The open part of the C can be opened further to allow the weatherstrip to be caused to straddle the two strips which form the core of the division pillar. The division pillar molding 12 may be snapped into the clefts 13 left in the division pillar weatherstrip.

Next, the glass panels 14 and 15, which are enclosed in a rubber channel frame 16, can be shoved in place from the inside of the windshield opening and seated upon a seat 30 formed by the inner stamping. Then, the inner division molding 17 may be put in place and secured by screws 18 which screw into the T nuts 10. The inside garnish molding 19 may then be set in place and, finally, the ornamental or reveal molding 5 on the outside may be snapped in place.

It will be noticed that the Z-like pinch-weld flange sealing strip is fluted as at 20 so that it more securely seals the joint between the rubber channel strip and the sealing strip when the screws 21 secure the garnish molding tightly in place.

Preferably, the joints to be made with the rubber strips are packed with rubber cement or dough, this being spread on as the parts are assembled. When the garnish molding 30 is driven by the oblique screw tightly against the rubber channel frame 16, this brings all the weathersealing parts, together with the rubber cement, tightly together and makes a substantially watertight-joint. The fluted character of strip 20 is calculated to retain the rubber cement and improve the joint.

What I claim is:

1. In an automobile body, the combination of an outer panel provided with a flange surrounding a window opening, an inner stamping forming a window seat and a flange to match the first mentioned flange and surround the window opening, a Z cross section weathersealing strip having inner and outer clefts with the outer cleft fitting over the mating flanges, a reveal molding fitting over the weatherstrip and hooking into the inner cleft of said sealing strip, a glass panel, a rubber channel member fitting into the said seat formed by the inner stamping and straddling the edge of said glass panel and a garnish molding for forcing the glass panel and the rubber channel strip firmly against the sealing strip and the reveal molding, the two strips contacting face to face.

2. In an automobile body, the combination of an outer panel provided with a flange surrounding a window opening, an inner stamping forming a window seat and a flange to match the first mentioned flange and surround the window opening, a Z cross section weathersealing strip fitting over the mating flanges and provided with a fluted surface on the outside of the inner bar of the Z, a glass panel, a rubber channel member fitting into the said seat formed by the inner stamping and straddling the edge of said glass panel and a garnish molding for forcing the glass panel and the rubber channel strip firmly against the sealing strip and said fluted surface.

3. In an automobile body, the combination of an outer panel provided with a flange surrounding a window opening, an inner stamping forming a window seat and a flange to match the first mentioned flange and surround the window opening, a weathersealing strip fitting over the mating flanges, said weathersealing strip being of roughly Z cross section and having oppositely opening clefts, one cleft fitting over the mating flanges and a reveal molding fitting into the other cleft, a glass panel supported in a rubber channel strip and a garnish molding for forcing the glass panel and the rubber channel strip against the sealing strip and the reveal molding, the said strips contacting face to face.

4. In an automobile body provided with a windshield opening surrounded by flanges and a division pillar core extending across the windshield opening from the flanges along the bottom to the flanges along the top, a sealing strip of roughly Z shape in cross section and having oppositely facing clefts except at the division pillar core where the sealing strip is cut away at the back to pass over the division pillar core, the said sealing strip having the front cleft fitting over the said flanges, a window unit including a glass panel and a rubber channel frame secured in place behind the division pillar core and the said flanges and the said sealing strip and means for forcing the said window unit forward into intimate contact with said sealing strip, a rubber molding that fits over the division pillar core and an outer division pillar molding fitting over the rubber molding and secured thereto and an inner division pillar molding secured by screws to the said division pillar core.

ROY H. DEAN.